United States Patent
Kim

(10) Patent No.: US 12,086,251 B2
(45) Date of Patent: Sep. 10, 2024

(54) IoT DEVICE AND METHOD FOR DETECTING AND REMOVING MALWARE BY USE OF SERVER RESOURCE

(71) Applicant: SANDS LAB Inc., Seoul (KR)

(72) Inventor: Kihong Kim, Seoul (KR)

(73) Assignee: SANDS LAB Inc., Seoul (KR)

( * ) Notice: Subject to any disclaimer, the term of this patent is extended or adjusted under 35 U.S.C. 154(b) by 13 days.

(21) Appl. No.: 17/541,562

(22) Filed: Dec. 3, 2021

(65) Prior Publication Data

US 2022/0179956 A1 Jun. 9, 2022

(30) Foreign Application Priority Data

Dec. 7, 2020 (KR) .................. 10-2020-0169577

(51) Int. Cl.
G06F 21/56 (2013.01)
(52) U.S. Cl.
CPC ...... *G06F 21/567* (2013.01); *G06F 2221/033* (2013.01)
(58) Field of Classification Search
CPC .................................................. G06F 21/567
See application file for complete search history.

(56) References Cited

U.S. PATENT DOCUMENTS

| | | | | |
|---|---|---|---|---|
| 10,372,908 | B2* | 8/2019 | Malachi | G06F 9/54 |
| 10,411,959 | B1* | 9/2019 | Faibish | G06F 16/951 |
| 10,433,140 | B2* | 10/2019 | Best | H04L 67/51 |
| 10,528,725 | B2* | 1/2020 | Samuel | H04W 4/70 |
| 10,554,726 | B1* | 2/2020 | Mattison | H04L 69/321 |
| 10,838,710 | B2* | 11/2020 | Rodriguez Bravo | H04W 12/37 |
| 10,924,347 | B1* | 2/2021 | Narsian | H04L 47/12 |
| 11,032,245 | B2* | 6/2021 | Chakraborty | H04W 12/088 |
| 11,050,714 | B2* | 6/2021 | Weisshaupt | H04L 63/1425 |
| 11,228,887 | B2* | 1/2022 | Kesavan | H04L 41/12 |
| 12,013,941 | B2* | 6/2024 | Kurtz | G06F 21/566 |
| 2010/0043072 | A1 | 2/2010 | Rothwell | |

(Continued)

FOREIGN PATENT DOCUMENTS

| | | |
|---|---|---|
| JP | 2008-077600 A | 4/2008 |
| JP | 2008-293525 A | 12/2008 |

(Continued)

*Primary Examiner* — Viral S Lakhia
(74) *Attorney, Agent, or Firm* — United One Law Group LLC; Kongsik Kim; Jhongwoo Peck

(57) ABSTRACT

The present disclosure provides an IoT device which comprise a user application module; an OS API module; a kernel API module; a file system driver module; a file filter driver module; and a network filter driver module. The user application module generates read/write event when an external file is received. The OS API module calls the kernel API module when the event is generated. The kernel API module transmits the read/write event to the file system driver module. The file system driver module generates the read/write operation command and transmits the command to the file filter driver module. The file filter driver module transmits the read/write operation command to the network filter driver module. The network filter driver module generates a exclusive packet including the read/write operation command and transmits the packet to a packet processing application module of a remote server.

4 Claims, 3 Drawing Sheets

(56) References Cited

U.S. PATENT DOCUMENTS

| | | | | |
|---|---|---|---|---|
| 2015/0205962 A1* | 7/2015 | Swidowski | ............ | G06F 21/554 |
| | | | | 726/23 |
| 2017/0214701 A1* | 7/2017 | Hasan | ................. | H04L 63/1433 |
| 2019/0156035 A1* | 5/2019 | Jung | ................... | G06F 11/3644 |
| 2020/0259710 A1* | 8/2020 | Muniyan | ........... | G06F 16/24568 |
| 2020/0358858 A1* | 11/2020 | Shribman | ............... | G06F 9/547 |
| 2021/0035697 A1* | 2/2021 | Ree | .................... | H04L 63/1425 |
| 2021/0117544 A1* | 4/2021 | Kurtz | ................... | G06F 21/566 |
| 2021/0160253 A1* | 5/2021 | Lee | ........................ | H04L 63/1408 |
| 2021/0374987 A1* | 12/2021 | Ma | ............................ | G06T 7/73 |
| 2022/0147630 A1* | 5/2022 | Ikeda | ................... | G06F 21/562 |
| 2022/0263839 A1* | 8/2022 | Fujii | ..................... | H04L 63/145 |

FOREIGN PATENT DOCUMENTS

| | | | |
|---|---|---|---|
| JP | 2010-198368 | A | 9/2010 |
| JP | 2011-248763 | A | 12/2011 |
| KR | 101625643 | B1 | 5/2016 |
| KR | 101679578 | B1 | 11/2016 |
| KR | 101692917 | B1 | 1/2017 |
| KR | 1020170059636 | A | 5/2017 |
| KR | 1020190073409 | A | 6/2019 |
| KR | 1020190105167 | A | 9/2019 |
| KR | 102322408 | B1 | 11/2021 |

\* cited by examiner

IoT DEVICE AND METHOD FOR DETECTING AND REMOVING MALWARE BY USE OF SERVER RESOURCE

CROSS-REFERENCE TO RELATED APPLICATION

This application claims priority to Korean Patent Application No. 10-2020-0169577 filed on Dec. 7, 2020. The application is expressly incorporated herein by reference.

TECHNICAL FIELD

The present disclosure relates to an IoT device that reads data from a remote storage media and write data to the media. Particularly, the present disclosure relates to an IoT device which detects and removes malware by use of a remote server resource and the method thereof.

BACKGROUND

Recently, IoT devices is popular due to low-power and ultra-compact computing thereof. The IoT devices have been introduced in home appliances, portable devices, automobiles, and the like as well as components of smart building and smart cities. The application and utility of the IoT devices is extending to every human life. Thus, it is expected that the use of IoT devices continues to grow.

The IoT devices are designed to use the conventional IT infrastructure. Thus, the IoT devices has also the problems which are incurred in the conventional IT technologies. In particular, the security threat to the IoT devices is becoming a serious problem.

The security threat to the IoT devices were considered from the beginning. However, the recent explosive growth of the IoT devices has caused severe security issues beyond the expectation. The IoT devices are introduced in the appliances which are used in human life so that the leakage of private information can be incurred. The security problems of the IoT devices which are used in a factory can cause physical damage and economic losses.

In order to address the problems, the conventional IT security technologies are tried to be introduced to the IoT devices. However, the arithmetic scope and storage capacity of the IoT devices are limited due to the low-power, limited power supply and various environmental elements. Thus, it is technically limited to introduce the conventional IT security technologies to the IoT devices.

The conventional anti-malware system compares a file on a disk, a process, or a memory with a pattern database of malware to check whether there is a malware and then delete or treat the file if the file matches with the pattern database.

Generally, the IoT devices has a minimum storage capacity or no storage. Many IoT devices are operated by a firmware. Thus, the IoT devices has insufficient storage capacity for storing pattern database of malware and insufficient resources for pattern matching operation. The inclusion of the sufficient storage capacity and the resource to the IoT devices causes increase of production costs.

SUMMARY

The object of the present disclosure is to provide an IoT device which effectively protects it from malware by overcoming the limitations of the IoT devices and using network resources.

The present disclosure provides an IoT device An IoT device which comprises a user application module; an OS API module; a kernel API module; a file system driver module; a file filter driver module; and a network filter driver module.

The user application module generates read/write event when an external file is received; the OS API module calls the kernel API module when the event is generated; the kernel API module transmits the read/write event to the file system driver module; the file system driver module generates the read/write operation command and transmits the command to the file filter driver module; the file filter driver module transmits the read/write operation command to the network filter driver module; and the network filter driver module generates a packet including the read/write operation command and transmits the packet to a packet processing application module of a remote server computer.

The server computer can comprise an anti-malware application module which generates a malware detecting event when the file is recorded at a server disk; a database module where malware information is recorded; and an anti-malware engine which detects malware with reference to the database module according to the event and carries out treatment to the malware.

The present disclosure also provides a computer-implemented method for carrying out read/write command of an IoT device including a user application module, an OS API module, a kernel API module, a file system driver module, a file filter driver module, and a network filter driver module. The method comprises generating, by the user application module, a read/write event when an external file is received; calling, by the OS API module, the kernel API module when the event is generated; transmitting, by the kernel API module, the read/write event to the file system driver module; generating, by the file system driver module, a read/write operation command, transmitting, by the file system driver module, the read/write operation command to the file filter driver module; transmitting, by the file filter driver module, the read/write operation command to the network filter driver module; generating, by the network filter driver module, a packet including the read/write operation command; and transmitting, by the network filter driver module, the packet to a packet processing application module of a remote server computer Further, the present disclosure provides a computer program product which comprises one or more computer-readable storage media and program instructions stored in at least one of the one or more storage media. The program instructions executable by a processor to cause the processor to perform the method of the present disclosure.

Figure 1:
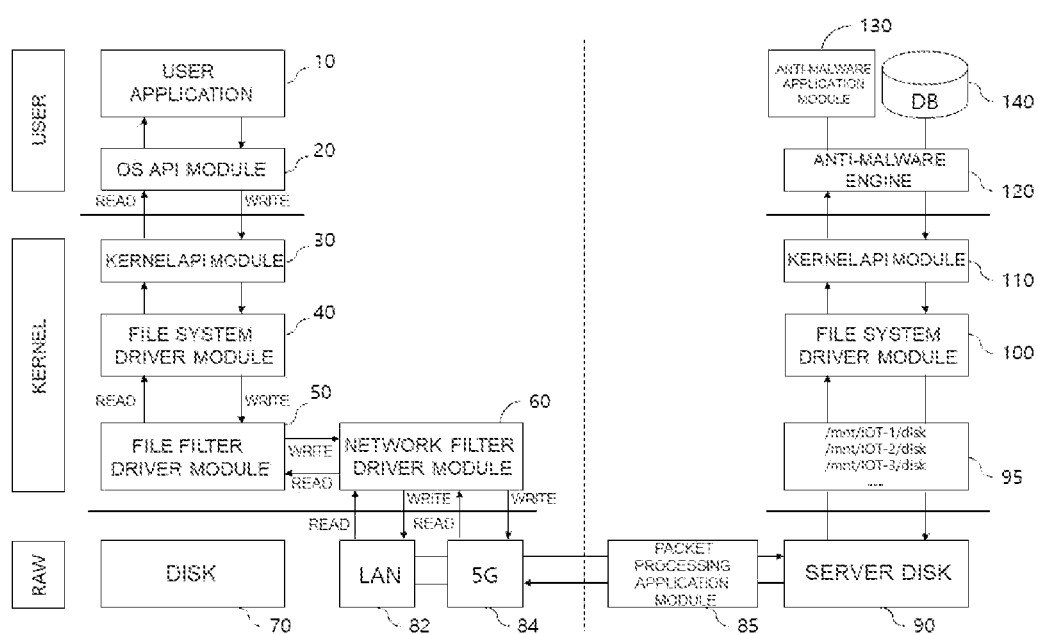
FIG. 1 is a drawing of the IoT device of the present disclosure and a remote server computer.

It should be understood that the above-referenced drawings are not necessarily to scale, presenting a somewhat simplified representation of various preferred features illustrative of the basic principles of the disclosure. The specific design features of the present disclosure will be determined in part by the particular intended application and use environment.

DETAILED DESCRIPTION

Hereinafter, the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

In this specification, the order of each step should be understood in a non-limited manner unless a preceding step must be performed logically and temporally before a following step. That is, except for the exceptional cases as described above, although a process described as a following step is preceded by a process described as a preceding step, it does not affect the nature of the present disclosure, and the scope of rights should be defined regardless of the order of the steps. In addition, in this specification, "A or B" is defined not only as selectively referring to either A or B, but also as including both A and B. In addition, in this specification, the term "comprise" has a meaning of further including other components in addition to the components listed.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. The term "coupled" denotes a physical relationship between two components whereby the components are either directly connected to one another or indirectly connected via one or more intermediary components.

The term "module" or "unit" means a logical combination of a universal hardware and a software carrying out required function.

The terms "first," "second," or the like are herein used to distinguishably refer to same or similar elements, or the steps of the present disclosure and they may not infer an order or a plurality.

In this specification, the essential elements for the present disclosure will be described and the non-essential elements may not be described. However, the scope of the present disclosure should not be limited to the invention including only the described components. Further, it should be understood that the invention which includes additional element or does not have non-essential elements can be within the scope of the present disclosure.

The method of the present disclosure can be carried out by an IoT device and/or an electronic arithmetic device. The IoT device and/or server computer is provided with a computer program product which comprises one or more computer-readable storage media and program instructions stored in at least one of the one or more storage media. The program instructions is executable by a processor to cause the processor to perform the method of the present disclosure.

The electronic arithmetic device can be a device such as a computer, tablet, mobile phone, portable computing device, stationary computing device, server computer etc. Additionally, it is understood that one or more various methods, or aspects thereof, may be executed by at least one processor. The processor may be implemented on a computer, tablet, mobile device, portable computing device, etc. A memory configured to store program instructions may also be implemented in the device(s), in which case the processor is specifically programmed to execute the stored program instructions to perform one or more processes, which are described further below. Moreover, it is understood that the below information, methods, etc. may be executed by a computer, tablet, mobile device, portable computing device, etc. including the processor, in conjunction with one or more additional components, as described in detail below. Furthermore, control logic may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Figure 3:
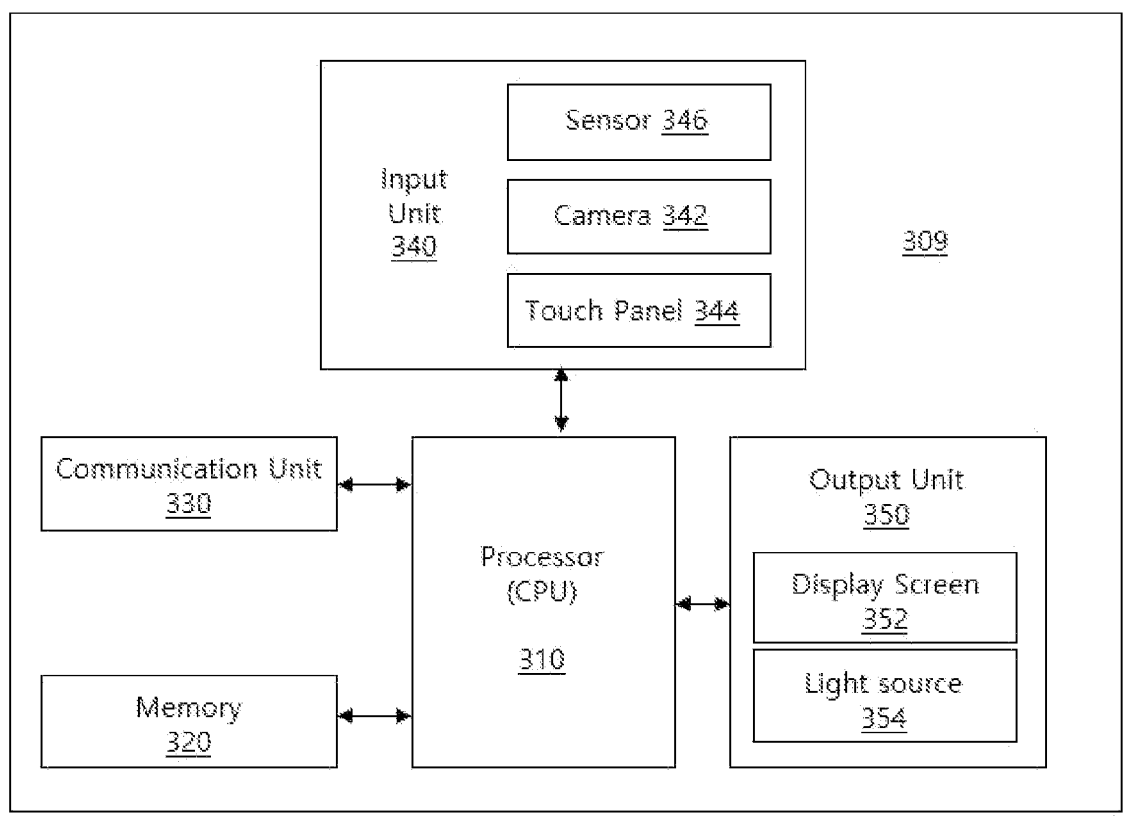
FIG. 3 is an exemplary block diagram of the electronic arithmetic device carrying out the method of the present disclosure.

A variety of devices can be used herein. FIG. 3 illustrates an example diagrammatic view of an exemplary device architecture according to embodiments of the present disclosure. As shown in FIG. 3, a device (309) may contain multiple components, including, but not limited to, a processor (e.g., central processing unit (CPU); 310), a memory (320; also referred to as "computer-readable storage media), a wired or wireless communication unit (330), one or more input units (340), and one or more output units (350). It should be noted that the architecture depicted in FIG. 3 is simplified and provided merely for demonstration purposes. The architecture of the device (309) can be modified in any suitable manner as would be understood by a person having ordinary skill in the art, in accordance with the present claims. Moreover, the components of the device (309) themselves may be modified in any suitable manner as would be understood by a person having ordinary skill in the art, in accordance with the present claims. Therefore, the device architecture depicted in FIG. 3 should be treated as exemplary only and should not be treated as limiting the scope of the present disclosure.

The processor (310) is capable of controlling operation of the device (309). More specifically, the processor (310) may be operable to control and interact with multiple components installed in the device (309), as shown in FIG. 3. For instance, the memory (320) can store program instructions that are executable by the processor (310) and data. The process described herein may be stored in the form of program instructions in the memory (320) for execution by the processor (310). The communication unit (330) can allow the device (309) to transmit data to and receive data from one or more external devices via a communication network. The input unit (340) can enable the device (309) to receive input of various types, such as audio/visual input, user input, data input, and the like. To this end, the input unit (340) may be composed of multiple input devices for accepting input of various types, including, for instance, one or more cameras (342; i.e., an "image acquisition unit"), touch panel (344), microphone (not shown), sensors (346), keyboards, mice, one or more buttons or switches (not shown), and so forth. The term "image acquisition unit," as used herein, may refer to the camera (342), but is not limited thereto. The input devices included in the input (340) may be manipulated by a user. The output unit (350) can display information on the display screen (352) for a user to view. The display screen (352) can also be configured to accept one or more inputs, such as a user tapping or pressing the screen (352), through a variety of mechanisms known in the art. The output unit (350) may further include a light source (354). The device (309) is illustrated as a single component, but the device may also be composed of multiple, separate components that are connected together and interact with each other during use.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Figure 2:
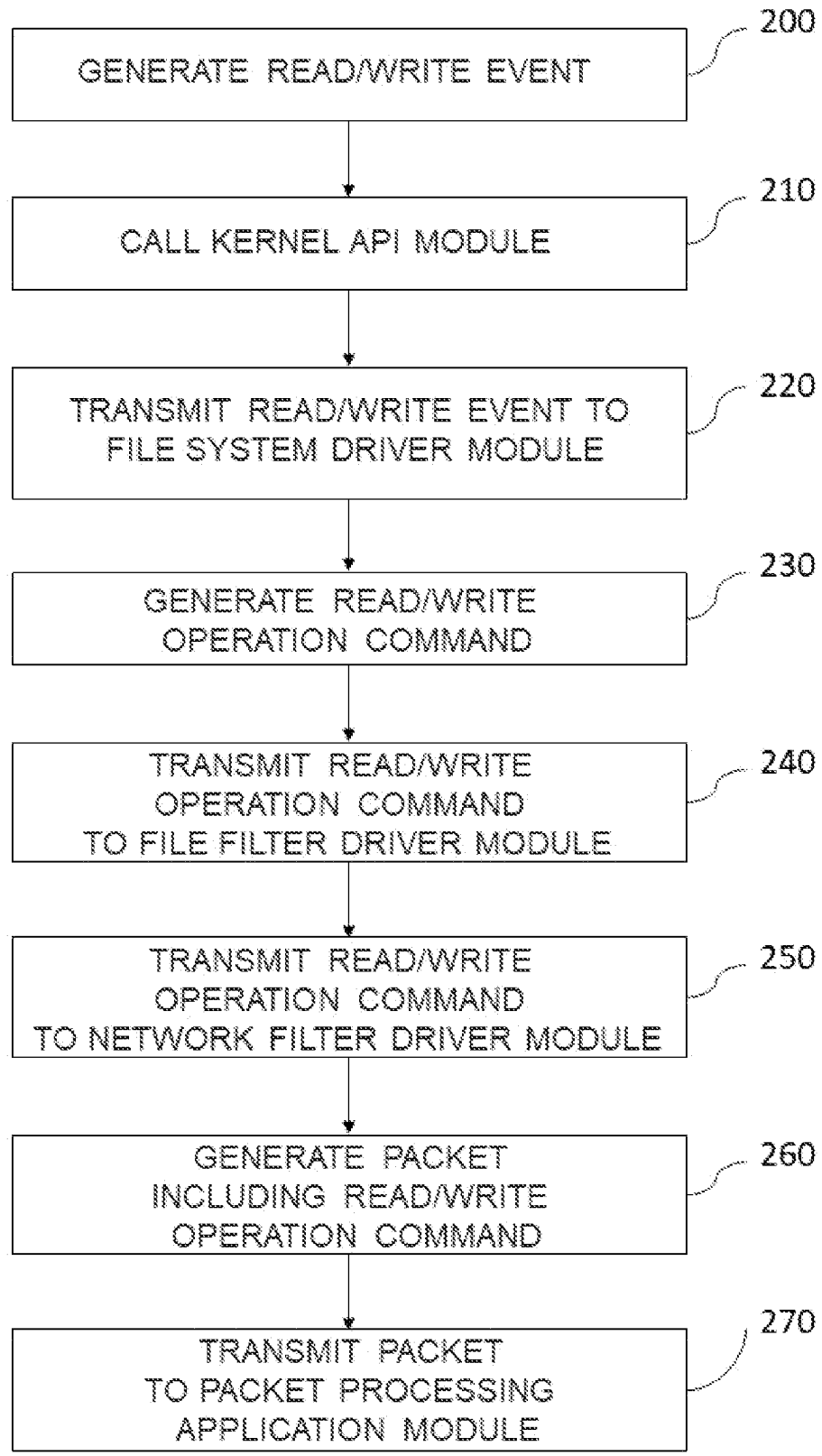
FIG. 2 is a flow chart of the method carrying out the read/write commend of the IoT device of the present disclosure.

FIG. 1 shows an exemplary structure of the IoT device and the anti-malware server computer according to the present disclosure. FIG. 2 shows the flow chart of the method for read/write command of the IoT device according to the present disclosure. For convenience of description, this specification describes the embodiments of carrying out "write" command when a malware intrudes into the IoT device. However, without substantial modifications, the description can be applied to the embodiments wherein "read" command is carried out for other functions.

The IoT device of the present disclosure comprises a user application module (10), an OS API module (20), a kernel API module (30), a file system driver module (40), a file filter driver module (50), a network filter driver module (60) and a disk (70).

When an external file including malware intrudes into the IoT device, the user application module (10) generates a file-write event (step 200). The event calls the kernel API module (30) which is provided in kernel level, via the OS API module (20) (step 210).

The kernel API module (30) transmits the file-write command to the file system driver module (40) (step 220). The file system driver module (40) generates a write-operation command based on the received event (step 230) and transmits the generated write-operation command to the file filter driver module (50) (step 240). The file filter driver module (50) transmits the received write-operation command to the network filter driver module (60) (step 250). The file filter driver module (50) and the network filter driver module (60) can be provided in the kernel level of the IoT device.

The network filter driver module (60) generates a packet including the write-operation command (step 260) and transmits the packet to the packet processing application module (85) of the server computer through communication devices (82, 84) (step 270). The packet processing application module (85) records data in a specific directory and file area of the server disk (90) based on the received packet.

The server disk which receives the write-operation command stores the file in the server disk (90) according to the command. According to the present disclosure, the disk (70) of the IoT device needs only a firmware area for operating the IoT device and does not need storage medium for storing the received external files or data generated during the operation. That is, according to the present disclosure, the IoT device can use the storage medium of the server computer, which has relatively large capacity. In this specification, the term "remote" is used for indicating a separate device from the IoT device, not meaning "physical distance."

The server computer carries out the write-operation to the server disk based on the received write-operation command. The server computer can carry out the write-operation to separate directories (95) which are assigned to each IoT device.

The server computer comprises an anti-malware engine (120), an anti-malware application module (130) and a database (140) where malware information is recorded.

The constitution of the anti-malware engine and the anti-malware application module is well known and thus the detailed descriptions thereof are omitted.

When the write-operation is carried out to the server disk (90), the anti-malware application module (1300) generates a malware detecting event; the anti-malware engine (120) checks from the database (140) whether the file includes a malware; and the engine immediately delete or treat the file if the malware is detected.

According to the present disclosure, an anti-malware application module and an anti-malware engine which detect and treat a malware intruding into an IoT device need not to be provided in the IoT device. Further, it is advantageous in terms of production cost because the files generated during the operation of the IoT device are not stored in the disk (70) of the IoT device and only a firmware is recorded on the disk (70).

Although the present disclosure has been described with reference to accompanying drawings, the scope of the present disclosure is determined by the claims described below and should not be interpreted as being restricted by the embodiments and/or drawings described above. It should be clearly understood that improvements, changes and modifications of the present disclosure disclosed in the claims and apparent to those skilled in the art also fall within the scope of the present disclosure. Accordingly, this description is to be taken only by way of example and not to otherwise limit the scope of the embodiments herein.

The invention claimed is:

1. An Internet of Things (IoT) device comprising:
a user application module;
an operating system (OS) application programming interface (API) module;
a kernel API module;
a file system driver module;
a file filter driver module; and
a network filter driver module,
wherein the file filter driver module and the network filter driver module are provided in a kernel level of the IoT device,
wherein, in response to the user application module generating a file-write event upon receiving an external file, the OS API module calls the kernel API module such that the file-write event is handled at the kernel level of the IoT device before the file is written to a disk of the IoT device, and
wherein the kernel API module transmits the file-write event to the file system driver module;
the file system driver module generates a write operation command, which includes the file, and transmits the write operation command to the file filter driver module;
the file filter driver module transmits the write operation command to the network filter driver module; and
the network filter driver module generates a packet including the write operation command and transmits the packet to a remote server computer, thereby allowing the IoT device to use resources of the server computer for detecting malware.

2. The IoT device according to claim 1, wherein the server computer comprises an anti-malware application module which generates a malware detecting event when the file is recorded at a server disk; a database module where malware information is recorded; and an anti-malware engine which detects malware with reference to the database module according to the event and carries out treatment to the malware.

3. A computer-implemented method for carrying out write command of an Internet of Things (IoT) device including a user application module, an operating system (OS) application programming interface (API) module, a kernel API module, a file system driver module, a file filter driver module, and a network filter driver module, wherein the file filter driver module and the network filter driver module are provided in a kernel level of the IoT device, the method comprising:
in response to the user application module generating a file-write event upon receiving an external file, calling, by the OS API module, the kernel API module such that the file-write event is handled at the kernel level of the IoT device before the file is written to a disk of the IoT device;
transmitting, by the kernel API module, the file-write event to the file system driver module;
generating, by the file system driver module, a write operation command, which includes the file;
transmitting, by the file system driver module, the write operation command to the file filter driver module;
transmitting, by the file filter driver module, the write operation command to the network filter driver module;
generating, by the network filter driver module, a packet including the write operation command; and
transmitting, by the network filter driver module, the packet to a remote server computer, thereby allowing the IoT device to use resources of the server computer for detecting malware.

4. A non-transitory computer-readable storage medium containing program instructions executable by a processor, the program instructions when executed by the processor configured to:
in response to a user application module generating a file-write event upon an Internet of Things (IoT) device receiving an external file, call, by an operating system (OS) application programming interface (API) module, a kernel API module such that the file-write event is handled at a kernel level of the IoT device before the file is written to a disk of the IoT device;
transmit, by the kernel API module, the file-write event to a file system driver module;
generate, by the file system driver module, a write operation command, which includes the file;
transmit, by the file system driver module, the write operation command to a file filter driver module;
transmit, by the file filter driver module, the write operation command to a network filter driver module;
generate, by the network filter driver module, a packet including the write operation command; and
transmit, by the network filter driver module, the packet to a remote server, thereby allowing the IoT device to use resources of the server computer for detecting malware,
wherein the file filter driver module and the network filter driver module are provided in the kernel level of the IoT device.

* * * * *